US008852813B2

(12) United States Patent
Madabusi et al.

(10) Patent No.: US 8,852,813 B2
(45) Date of Patent: Oct. 7, 2014

(54) ELECTROLYTES COMPRISING POLYCYCLIC AROMATIC AMINE DERIVATIVES

(75) Inventors: Venkat Madabusi, Naugatuck, CT (US); Gerard Mulqueen, Watertown, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 13/550,847

(22) Filed: Jul. 17, 2012

(65) Prior Publication Data
US 2013/0022863 A1 Jan. 24, 2013

Related U.S. Application Data

(60) Provisional application No. 61/510,685, filed on Jul. 22, 2011.

(51) Int. Cl.
*H01M 2/16* (2006.01)
*H01M 10/052* (2010.01)
*H01M 10/0567* (2010.01)
*H01M 10/42* (2006.01)

(52) U.S. Cl.
CPC .... *H01M 10/052* (2013.01); *H01M 2300/0025* (2013.01); *Y02E 60/122* (2013.01); *H01M 10/0567* (2013.01); *H01M 10/4235* (2013.01)
USPC ........... 429/248; 429/188; 429/300; 429/304; 429/231.95

(58) Field of Classification Search
CPC . C08L 53/02; C08L 2666/02; C08L 2666/04; H01M 10/052; H01M 10/0567; H01M 10/0564; H01M 10/4235; H01M 2300/0025; Y02E 60/122
USPC ..................... 429/188, 300, 304, 231.95, 248
See application file for complete search history.

(56) References Cited

U.S. PATENT DOCUMENTS

2009/0208835 A1\* 8/2009 Horiuchi et al. ............... 429/156

FOREIGN PATENT DOCUMENTS

JP 2001-202994 \* 7/2001 ............ H01M 10/40

\* cited by examiner

*Primary Examiner* — Patrick Ryan
*Assistant Examiner* — Ben Lewis
(74) *Attorney, Agent, or Firm* — Joseph Suhadolnik; George Romanik; Chemtura Corporation

(57) ABSTRACT

A non-aqueous electrolyte composition, useful in batteries, capacitors and the like, said electrolyte composition comprising an electrolyte support salt, a non-aqueous electrolyte carrier, and a polycyclic aromatic amine, e.g., a naphthyl amine.

11 Claims, 2 Drawing Sheets

ELECTROLYTES COMPRISING POLYCYCLIC AROMATIC AMINE DERIVATIVES

This application claims benefit under 35 USC 119(e) of U.S. Provisional Application No. 61/510,685 filed Jul. 22, 2011, the disclosure of which is incorporated herein by reference.

This invention relates to non-aqueous electrolytes comprising amines substituted by one or more polycyclic aromatic groups, for example, naphthyl groups, and to articles and devices such as batteries, capacitors and the like comprising them.

BACKGROUND

Technological advancements in computers, mobile telephones, digital cameras, entertainment devices, and other portable electronic devices, as well as battery powered or hybrid vehicles, have increased the demand for a power source that is capable of providing a high voltage. Suitable power sources that have a high voltage and a high energy density include lithium batteries, lithium ion secondary batteries, and double layer capacitors. Typically, these power sources comprise non-aqueous electrolytes as ion conductors. Solid, liquid and gel non-aqueous electrolytes are known.

Non-aqueous electrolytes, as referred to herein, are compositions that typically include an electrolyte carrier, e.g., a non-aqueous solvent, and an electrolyte salt solute, e.g., support salt, dissolved in the carrier. The electrolyte composition may be a solid solution as well as a liquid solution. For example, a non-aqueous electrolyte may be formed by dissolving an electrolyte support salt in an aprotic organic solvent, e.g., an ester, ether, amide, sulfalone etc. Well known solvents used for this purpose include cyclic carbonic acid esters, acyclic carbonic acid esters, cyclic carboxylic acid esters such as dimethyl carbonate, diethyl carbonate, propylene carbonate, dimethoxyethane, and mixtures thereof. Common electrolyte salts include lithium hexafluorophosphate ($LiPF_6$), lithium tetrafluoroborate ($LiBF_4$), lithium perchlorate ($LiClO_4$), lithium tetrachloroaluminate ($LiAlF_4$), lithium bromide (LiBr), and lithium hexafluoroarsenate ($LiAsF_6$).

Despite advances in the art, there are performance and safety issues still encountered with electrolytes used in batteries and the like. For example, improvements are still sought in charge and discharge characteristics of such devices, e.g., prolonging the charge and discharge cycle life of a non-aqueous-electrolyte secondary battery having a large discharging capacity. Also, aprotic solvents, such as those found in liquid and gel electrolytes, or used in the preparation of solid electrolytes, are usually combustible materials which may increase the risk of fires, especially when solvents leak from the respective device. An attempt to improve one characteristic of an electrolyte must not come at the expense of other characteristics, for example, improvements in safety must not adversely affect charge and discharge characteristics, and vice versa.

For example, some attempts to improve flame retardance have adversely affected battery performance. Addition of a phosphate such as trimethyl phosphate or the like to a non-aqueous electrolyte as disclosed in JP-A-H4-184870, JP-A-H8-22839 and JP-A-2000-182669 will improve flame retardance. However, these phosphates decompose during storage under high voltage, or during discharge and recharge, limiting battery performance. Similarly, a battery using a non-aqueous electrolyte comprising a combination of a fluorinated phosphate and a phosphazene compound, as disclosed in JP-A-2006-107910, exhibits high non-combustibility and good initial battery performances, but the battery capacity unacceptably decreases over time under exposure to high temperatures in a charged state, or when discharge-recharge are repeated at a low voltage.

Nitrogen containing compounds such as amines, amine salts and other amine derivatives have been used in non-aqueous electrolytes to improve performance and enhance safety related characteristics. For example, U.S. Pat. No. 5,759,714, incorporated herein by reference, discloses a non-aqueous electrolyte secondary battery with excellent charge/discharge characteristics and longer lasting discharge capacity obtained by using an electrolyte containing a nitrogen containing organic compound, such as an amine or an alkali metal salt of an aromatic amine.

Nitrogen containing compounds have also been used to facilitate improvements in flame retardance. U.S. Patent Application Publication No. 2008/0020285, incorporated herein by reference, discloses a flame retardant non-aqueous electrolyte for a battery comprising a cyclic phosphazene compound, a difluorophosphate compound, an aniline derivative and a support salt. The electrolyte and battery of U.S. Pat Appl Pub No. 2008/0020285 is similar to those of JP-A-H4-184870, JP-A-H8-22839, JP-A-2000-182669 and JP-A-2006-107910 above, but it appears that the presence of the aniline derivative helps prevent degradation of the flame retardant phosphorus compounds while improving the high temperature and long term performance of the battery.

It has been found that certain polycyclic aromatic amines, such as naphthyl amines, are surprisingly more suitable than other amine additives for use in non-aqueous electrolytes intended for use in batteries, capacitors and the like. The present naphthyl amines are effective stabilizers for components of the non-aqueous electrolyte and enhance the charge/discharge characteristics of a device containing it. The amines of the present electrolyte are less prone to degradation themselves during, e.g., repetition of discharge/recharge cycles, than the nitrogen containing compounds exemplified in U.S. Pat. No. 5,759,714 or described in U.S. 200810020285, and exhibit high temperature stability. Also, the present amines, and electrolytes containing them, do not foul electrodes, which is known to greatly reduce efficiency of a battery.

SUMMARY OF THE INVENTION

The present invention provides a non-aqueous electrolyte composition useful in batteries, capacitors and the like, which electrolyte comprises an electrolyte salt, a non-aqueous electrolyte carrier and a polycyclic aromatic amine additive, that is, the additive is an amine or amine salt wherein the nitrogen is substituted by at least one polycyclic aromatic ring such as naphthalene, anthracene, biphenyl, indane etc. Naphthyl amines for example have provided excellent results and are readily available. The electrolyte may be a liquid, solid or gel electrolyte, often a liquid or gel electrolyte, and typically comprises an organic solvent. The invention is not exclusive to any particular non-aqueous electrolyte type or composition and may contain other components such as flame retardants and commonly encountered additives and adjuvants. More than one polycyclic aromatic amine may be present.

Incorporating the non-aqueous electrolyte of the present invention in a secondary battery can provide a battery with excellent charge and discharge characteristics wherein the decrease of discharge capacity due to repeated charging/discharging is small.

The present electrolyte composition can also be used in other types of electroactive devices such as electrochromic and electrophoretic devices and other active devices, or organic materials which are subjected to voltage or electric current. It is also expected for example, that polycyclic aromatic amines, such as the naphthylamines of the present invention, will be useful as additives in organic conductors, e.g., well known conductive polymers such as polymers of thiophenes, anilines, pyrroles etc. Electrochromic and electrophoretic devices are well known and are described, e.g., in U.S. Pat. No. 7,595,011, US 2010/0090169 and the references cited therein, the relevant portions of which are incorporated herein by reference.

DESCRIPTION OF THE INVENTION

Figure 1:
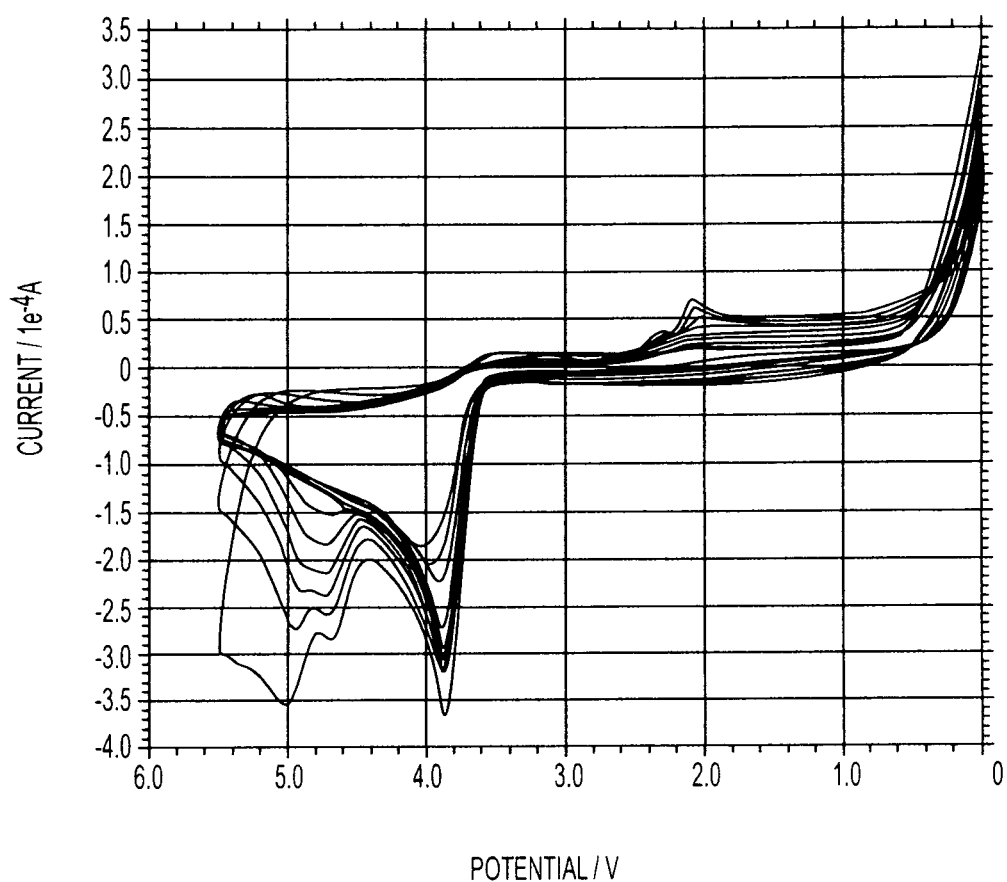
FIG. 1 shows the cyclic voltamograms obtained following the procedure of the present examples on the electrolyte solution prepared according to the present examples using the amine of Example 4.

One embodiment of the invention provides a non-aqueous electrolyte comprising an electrolyte salt, a non-aqueous electrolyte carrier and a polycyclic aromatic amine such as a naphthyl amine of the formula (I), or a salt or a derivative thereof,

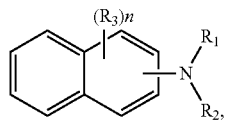

(I)

wherein:
$R_1$ is $C_{1-24}$ alkyl, $C_{3-24}$ cyclic alkyl, $C_{2-24}$ alkenyl, $C_{6-14}$ aryl or $C_{7-17}$ aralkyl, or substituted and/or interrupted $C_{2-24}$ alkyl, $C_{2-24}$ alkenyl, $C_{2-24}$ cyclicalkyl, $C_{5-14}$ aryl or $C_{7-17}$ aralkyl;
R2 is H or $C_{1-24}$ alkyl, $C_{2-24}$ alkenyl, $C_{3-24}$ cyclic alkyl, $C_{6-14}$ aryl or $C_{7-17}$ aralkyl, or substituted and/or interrupted $C_{1-24}$ alkyl, $C_{2-24}$ alkenyl, $C_{2-24}$ cyclic alkyl, $C_{5-14}$ aryl or $C_{7-17}$ aralkyl;
each $R_3$ may be at any position on the naphthyl ring and is independently selected from $C_{1-24}$ alkyl, $C_{2-24}$ alkenyl, $C_{3-24}$ cyclicalkyl, $C_{6-14}$ aryl or $C_{7-17}$ aralkyl, hydroxy, alkoxy, amino, amido, ester, alkylcarbonyl, sulfide, sulfoxy, sulfonyl, sulfate, and substituted and/or interrupted $C_{1-24}$ alkyl, $C_{2-24}$ alkenyl, $C_{2-24}$ cyclic alkyl, $C_{5-14}$ aryl, or $C_{7-17}$ aralkyl; and
n is a number 0, 1, 2, 3, 4, 5, 6, 7 or 8.

$C_{1-24}$ alkyl is a straight or branched alkyl group of the stated number of carbon atoms and includes methyl, ethyl and straight or branched propyl, butyl, pentyl, hexyl, heptyl, octyl, nonyl, decyl, undecyl, dodecyl, etc.

$C_{2-24}$ alkenyl is a straight or branched alkyl group of the stated number of carbon atoms which group comprises at least one carbon-carbon double bond.

$C_{3-24}$ cyclic alkyl is a non-aromatic carbocycle of the stated number of carbon atoms and includes cyclopropyl, cyclopentyl, cyclohexyl, cycloheptyl, cyclooctyl, cyclononyl, cyclodecyl, cycloundecyl, cylcododecyl etc, and also includes fused or spiro polycycles such as norbornane, decalin, etc and further includes non-aromatic carbocycles containing at least one carbon-carbon double bond.

$C_{6-14}$ aryl is an aromatic carbocycle or fused carbocycle of the stated number of carbon atoms and includes phenyl, naphthyl, biphenyl, anthracenyl, and also includes fused ring systems wherein one of the rings is aromatic such as indane etc.

$C_{7-17}$ aralkyl is substituent having the stated number of carbon atoms wherein an aryl group as described above is bound via an alkylene bridge and includes benzyl, styryl, cumyl, phenethyl, naphthylmethylene and the like.

An interrupted R group is a substituent as described above wherein two carbon atoms are bound to the same linking group, said linking group being —O—, —CO—, COO—, —NH—, —N(alkyl), —N(alkylcarbonyl)-, —S—, —SO— or $SO_2$—; for example, —O—, —CO—, COO— or $SO_2$—. More than one linking group may be present forming for example a polyether or an amino ether etc. An interrupted cyclic group forms a heterocycle such as a furan or tetrahydrofuran etc.

A substituted R group is a substituent or an interrupted R group as defined above which also bears a substituent such as an alkyl, hydroxy, alkoxy, alkylcarbonyl, alkylcarbonyloxy, carboxytate, amino, amido, sulfide, sulfoxy, sulfonyl, sulfate or halogen; for example alkyl, hydroxy, alkoxy, alkylcarbonyloxy, carboxylate, sulfonyl or sulfate.

For example, the naphthyl amine of the invention is a compound of formula (I) wherein
$R_1$ is $C_{1-24}$ alkyl, $C_{5-12}$ cyclic alkyl, $C_{3-12}$ alkenyl, $C_{6-14}$ aryl or $C_{7-12}$ aralkyl, or substituted and/or interrupted $C_{2-24}$ alkyl, $C_{3-12}$ alkenyl, $C_{3-12}$ cyclic alkyl, $C_{5-14}$ aryl or $C_{7-12}$ aralkyl;
$R_2$ is H or $C_{1-24}$ alkyl, $C_{5-12}$ cyclic alkyl, $C_{3-12}$ alkenyl, $C_{6-14}$ aryl or $C_{7-12}$ aralkyl, or substituted and/or interrupted $C_{2-24}$ alkyl, $C_{3-12}$ alkenyl, $C_{3-12}$ cyclic alkyl, $C_{5-14}$ aryl or $C_{7-12}$ aralkyl;
each $R_3$ is independently $C_{1-21}$ alkyl, $C_{5-12}$ cyclic alkyl, $C_{3-12}$ alkenyl, $C_{6-14}$ aryl, $C_{7-12}$ aralkyl, hydroxy, alkoxy, amino, sulfonyl, sulfate, or substituted and/or interrupted $C_{2-24}$ alkyl, $C_{3-12}$ alkenyl, $C_{3-12}$ cyclic alkyl, $C_{5-14}$ aryl or $C_{7-12}$; and
n is a number 0, 1, 2, 3, 4, 5 or 6, for example, 1, 2, 3, 4, for example, 0, 1 or 2.
For example
$R_1$ is $C_{1-24}$ alkyl, e.g., $C_{1-12}$ alkyl or $C_{1-9}$ alkyl; $C_{5-8}$ cyclic alkyl, phenyl, naphthyl, benzyl, styryl or cumyl;
$C_{2-24}$ alkyl, e.g., $C_{2-12}$ alkyl or $C_{2-9}$ alkyl or $C_{5-8}$ cyclic alkyl interrupted by —O—, —CO—, COO— or $SO_2$—, and/or substituted by alkyl, hydroxy, alkoxy, alkylcarbonyloxy, carboxylate, sulfonyl or sulfate; or
phenyl, naphthyl, benzyl, styryl or cumyl substituted by alkyl, hydroxy, alkoxy, alkylcarbonyloxy, carboxylate, sulfonyl or sulfate;
$R_2$ is H, $C_{1-24}$ alkyl, e.g., $C_{1-12}$ alkyl or $C_{1-9}$ alkyl; $C_{5-8}$ cyclic alkyl, phenyl, benzyl, styryl or cumyl;
$C_{2-24}$ alkyl, e.g., $C_{2-12}$ alkyl or $C_{2-9}$ alkyl or $C_{5-8}$ cyclic alkyl interrupted by —O—, —CO—, COO— or $SO_2$—, and/or substituted by alkyl, hydroxy, alkoxy, alkylcarbonyloxy, carboxylate, sulfonyl or sulfate; or
phenyl, benzyl, styryl or cumyl substituted by alkyl, hydroxy, alkoxy, alkylcarbonyloxy, carboxylate, sulfonyl or sulfate;
each $R_3$ is independently $C_{1-24}$ alkyl, e.g., $C_{1-12}$ alkyl or $C_{4-8}$ alkyl; $C_{5-8}$ cyclic alkyl, phenyl, benzyl, styryl, cumyl, hydroxy, alkoxy, amino, sulfonyl, sulfate;
$C_{2-24}$ alkyl, e.g., $C_{2-12}$ alkyl or $C_{4-8}$ alkyl, or $C_{5-8}$ cyclic alkyl interrupted by —O—, —CO—, COO— or $SO_2$—, and/or substituted by alkyl, hydroxy, alkoxy, alkylcarbonyloxy, carboxylate, sulfonyl or sulfate; or phenyl, benzyl, styryl or cumyl substituted by alkyl, hydroxy, alkoxy, alkylcarbonyloxy, carboxylate, sulfonyl or sulfate; and n is 0, 1, 2, 3 or 4, e.g., 0, 1 or 2.

In certain embodiments, $R_1$ is a substituted or unsubstituted phenyl or naphthyl, for example a compound of formula (II) or (III):

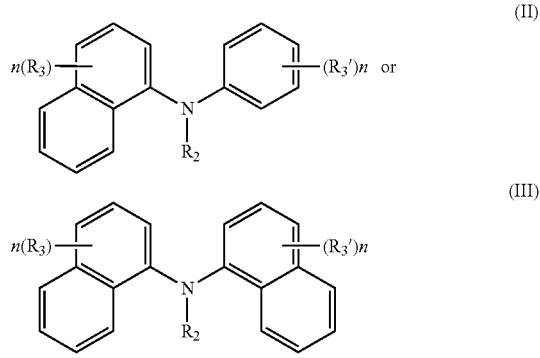

wherein R and each n are independently as defined above and each $R_3'$ is independently as defined above for $R_3$.

For example, the naphthyl amine additive of the invention is a compound of formula (II) or (III) wherein
each n is 0, 1, 2, 3 or 4, e.g., 0, 1 or 2;
each $R_3$ and $R_3'$ are independently selected from $C_{1-24}$ alkyl, $C_{5-8}$ cyclic alkyl, phenyl, benzyl, styryl, cumyl, hydroxy, $C_{1-12}$ alkoxy, sulfonyl or sulfate, e.g., $C_{1-12}$ alkyl or $C_{4-8}$ alkyl, phenyl, benzyl, cumyl, hydroxy or $C_{1-12}$alkoxy; and
$R_2$ is H, $C_{1-24}$ alkyl, $C_{5-8}$ cyclic alkyl, phenyl, benzyl,
$C_{2-24}$ alkyl interrupted by —O—, —CO— or —COO—, and/or substituted by hydroxy, alkoxy, alkylcarbonyloxy, carboxylate, sulfonyl or sulfate; or
phenyl or benzyl substituted by alkyl, hydroxy, alkoxy, alkylcarbonyloxy, carboxylate, sulfonyl or sulfate.

In certain embodiments the naphthyl amine additive of the invention is a compound of formula (II) or (III) wherein n is 0, 1 or 2; each $R_3$ and R3' are independently selected from $C_{4-8}$ alkyl, phenyl, benzyl or $C_{1-12}$ alkoxy; and $R_2$ is H, $C_{1-24}$ alkyl, $C_{5-8}$ cyclic alkyl, phenyl, benzyl, or phenyl or benzyl substituted by alkyl or $C_{1-12}$ alkoxy.

The naphthyl amine additives of the present invention are not polymers, that is, the additives are not compounds comprising 4 or more repeating units corresponding to compounds of formula I, but dimers or trimers of compounds of formula I may be considered. Monomeric compounds of formula I are generally used.

Unlike, for example, the amines of U.S. Pat Appl Pub No. 2008/0020285, the present naphthyl amines are not limited to amounts of 0.4% or less by weight of the electrolyte composition and can be used in any effective amount. In general, the naphthyl amine additive will be present in an amount of less than 10% by weight based on the total weight of the electrolyte composition, often less than 5% by weight. For example, the electrolyte composition typically contains from about 0.01% to about 10% by weight based on the total weight of the electrolyte composition of the naphthyl amine additive, for example, from about 0.01 to about 5%, for example about 0.1 to about 5% and in some embodiments from about 0.05 to 1.5% by weight. For example, in some embodiments there is at least about 0.05%, for example, at least about 0.25% or at least about 0.5% by weight of the naphthyl amine additive. In some embodiments there is about 4% or less, for example about 3% or less or about 2.5% or about 2% or less by weight of the naphthyl amine additive; all weight % being based on the total weight of the electrolyte composition. For example, the electrolyte composition may comprise from 0.5% to about 10% or 0.5 to 5% by weight the naphthyl amine additive.

The electrolyte composition of the invention comprises a non-aqueous carrier and an electrolyte salt, also referred to as the supporting electrolyte. The invention however is not limited to specific carriers or electrolyte salts, which can be for example any of the carriers or support salts currently known for use in a non-aqueous electrolyte such as those found in a lithium or lithium ion battery or other cation based batteries.

For example, common electrolyte salts include $LiClO_4$, $LiBF_4$, $LiPF_6$, $LiCF_3SO_3$, $LiCF_3CO_2$, $LiAsF_6$, $LiSbF_6$, lithium lower fatty acid carboxylates, $LiAlCl_4$, LiCl, LiBr, LiI, chloroborane lithium, $Li(CF_3SO_3)_2N$, $Li(C_2F_5SO_2)_2N$, $LiC_4F_9SO_3$, $Li(CF_3SO_2)_3C$, $LiBPh_4$, and $Li(CF_3SO_2)(CF_3CO)N$.

The electrolyte of the invention is of course applicable to a variety of batteries, such as rechargeable batteries using ions other than lithium, for example other alkali metal or other cation based batteries, in which case the electrolyte will comprise an appropriate corresponding salt. For example an electrolyte composition for a potassium-ion battery may include $KPF_6$ or other potassium-ion providing compound.

In some cases, the transport properties of a particular cation are enhanced through inclusion of other cationic species. When preparing an electrolyte for use in such a battery, a combination of salts of different metal ions may be used, for example, a source of alkali ions, such as Na+, K+, Cs+, may be incorporated into the electrolyte to increase Li+ conductivity in a molten salt electrolyte based Li-ion battery.

As one option, the electrolyte composition may be a molten salt electrolyte composition that contains one or more molten salts as a significant component, for example more than 10%, e.g., more than 20%, more than 30%, more than 50%, of the electrolyte composition. Molten salts, or ionic liquids, are salts that are least in part molten (or otherwise liquid) at the operating temperatures of the battery. Molten salt electrolyte compositions are well known and are described for example in U.S. Pat. Nos. 4,463,071; 5,552,241; 5,589,291; 6,326,104; 6,365,301; and 6,544,691.

Exemplary molten salts include, for example, those having an aromatic cation (such as an imidazolium salt or a pyridinium salt), an aliphatic quaternary ammonium salt, or a sulfonium salt. Common molten salts useful in the present electrolyte compositions often have as cations ammonium, phosphonium, oxonium, sulfonium, amidinium, imidazolium, pyrazolium ions, and often have as anions $PF_6$—, $BF_4$—, $CF_3SO_3$—, $(CF_3SO_2)_2N$—, $(FSO_2)_2N$—, $(C_2F_2SO_2)_2N$—, Cl—, Br— and the like.

The identity or amount of the electrolyte salts in the electrolyte composition is not particularly limited, and often depends on the positive electrode active material and the negative electrode material and the size of the battery. However, the selection of the salt and the amounts used for a particular application are well within the purview of one skilled in the art. For example, in many known applications, the concentration of the salts, inorganic such as lithium salts and/or organic such as some of the above molten salts, in the electrolyte composition may range from 0.1-5.0 M, e.g., from 0.2-1.5 M, or from 0.5-1.2 M.

The non-aqueous electrolyte carrier of the invention can be any carrier used in non-aqueous liquid, solid or gel electrolytes found in batteries, capacitors and other elctroactive devices.

When the non-aqueous electrolyte composition is a liquid, or comprises a liquid solvent, the solvent may vary widely and can include any solvent suitable for such purposes. Of course, in the case of liquid electrolytes, the solvent is the major component of the carrier. Examples of organic solvents useful in non-aqueous electrolytes include carbonates such as propylene carbonate, ethylene carbonate, diethyl carbonate, dimethyl carbonate, diphenyl carbonate, ethyl methyl carbonate, vinylidene carbonate, butylene carbonate or methyl ethylene carbonate; ethers such as diethyl ether, 1,2-dimethoxyethane, 1,2-diethoxyethane, tetrahydrofuran, 2-methyl tetrahydrofuran, 1,3-dioxolane or 4-methyl-1,3-dioxolane; lactones such as γ-butyrolactone or γ-valerolactone; other carboxyate esters such as acetates, butyrates or propionates; amides such as DMF or DMA; nitrites such as acetonitrile or propionitrile; anisole and similar aromatics; sulfides and sulfones such as sulfolane or methylsuifolane; and the like. Of course, mixtures of two or more, e.g., three or more, or four or more, of these solvents can also be used.

For example, common electrolytes include those comprising $LiCF_3SO_3$, $LiClO_4$, $LiBF_4$, and/or $LiPF_6$ together with ethylene carbonate, propylene carbonate, 1,2-dimethoxyethane, dimethyl carbonate, or diethyl carbonate.

Other solvents may also be present, either as inert co-solvents or as solvents which act as carriers in addition to having other active functions. For example, as disclosed in US Pat Appl Pub No. 2008/0020285, flame retarding phosphorus-containing compounds, i.e., phosphate, fluorophosphate and phosphazene, may be used at concentrations where they also function solvent or co-solvent carriers.

Solid electrolyte compositions are known and typically comprise a polymer electrolyte carrier. Examples of polymers used for the polymer electrolyte carrier include ether-based polymers such as polyethylene oxide and cross-linked polyethylene oxide, polymethacrylate ester-based polymers, acrylate-based polymers, and blends and mixtures comprising them.

Polymers are also used in gel electrolyte carriers including the preceding polymers as well as, e.g., polyacrylonitrile and copolymers of polyacrylonitrile. Examples of polymers used for the gel electrolyte carrier include for example, acrylonitrile-butadiene copolymer rubber, acrylonitrile-butadiene-styrene copolymer resin, acrylonitrile-chlorinated polyethylene-propylenediene-styrene copolymer resin, acrylonitrile-vinyl chloride copolymer resin, acrylonitrile-methacylate resin, acrlytonitrile-acrylate copolymer resin, fluorocarbon polymers such as polyvinylidene fluoride (PVDF), polyvinylidene-co-hexafluoropropylene (PVDF-HFP) and the like. Ether-based polymers are also used, for example, polyethylene oxide, copolymer of polyethylene oxide, and cross-linked polyethylene oxide.

The above solvents and polymers, and means of obtaining or preparing them are well known in the art. Except for the presence of the presently selected polycyclic aromatic amines, e.g., naphthyl amines, methods for preparing the electrolyte compositions are also well known in the art. Incorporation of the naphthyl amine requires no special technique and can be accomplished according to general procedures found in, e.g., U.S. Pat. No. 5,759,714 and U.S. Pat Appl Pub No. 2008/0020285 already incorporated by reference, by substituting the desired amount of present naphthyl amines for the amines used therein.

For example, the naphthyl amine is blended with the non-aqueous electrolyte carrier, and optionally blended with other additives. The electrolyte salt may then be dissolved in the mixture. Alternatively, the electrolyte salt is first dissolved in the non-aqueous electrolyte carrier before the naphthyl amine and optional additional additives are added. Once added, the electrolyte composition is optionally heated to increase dissolution. As an example, the electrolyte composition is heated to a temperature greater than 40° C., e.g., greater than 50° C. or greater than 75° C., for more than 10 minutes, e.g. more than 20 minutes, more than 30 minutes, or more than one hour. In terms of ranges, the electrolyte composition may be heated to a temperature ranging from 40° C. to 120° C., e.g., from 50° C. to 90° C. or from 50° C. to 70° C. The mixing and/or the heating may take place at pressures ranging from 0.5 atm to 10 atm, e.g. from 1 atm to 5 atm, or from 1 atm to 3 atm.

Many aromatic amines added to electrolyte compositions are the same as, or similar to, compounds known as antioxidants used in stabilizing polymers and lubricants. It is therefore quite possible that at least a portion of their utility in the present electrolytes is due to the ability of aromatic amines to stabilize components of the system against decomposition thus providing improved thermal stability. Of course this can not explain all of their activity in an electrolyte, but may correlate with observations of e.g., longer retention of battery capacity.

In functioning as antioxidants, the aromatic amines are believed to quench radicals and thus preventing the radical initiated chain reactions which can cause degradation. It is also possible that in a somewhat similar manner, the amines of the invention can also serve as flame retardants or flame retardant synergists improving the safety of the electrolytes and devices containing them.

A variety of commercial amine antioxidants were therefore tested for suitability as additives for electrolytes intended for use in batteries and the like. It was discovered during initial evaluation in liquid electrolyte compositions that many commercial amines, such as phenylamines, diphenylamines and phenylenediamines, often taught in the art as useful additives for electrolytes, tend to be inferior in certain aspects relative to naphthyl amines that were never exemplified in electrolytes.

In one set of experiments, a series of aromatic amines, including commercial phenylene diamines, diphenylamines, and naphthyl amines such as phenyl naphthyl amine and alkylated phenyl naphthylamines, were incorporated into a liquid electrolyte comprising a 1M solution of $LiPF_6$ in a 1:1 mixture by weight of ethylene glycol:diethyl glycol. In all experiments, an electrolyte with no additive was also tested as control. The concentration of the amine was 5% by weight based on the weight of the electrolyte. Repeated cyclic voltammograms run between 0V to 5.5V at an incremental rate of 0.1 V/s in a nitrogen-filled glove bag were run using an electrochemical cell comprising the amine/electrolyte solution, a glassy carbon electrode, lithium wire as counter and reference electrode.

Initial results show that that the inventive electrolytes are stable within the range of ca. 1V-6V, although it is anticipated that they will prove effective in higher voltage applications, e.g., up to 9V, 12 V and higher, e.g., up to 30V.

Additional testing involving repeated cyclic voltammogram scans to model a charge/recharge cycle of the above electrolytes, as well as similar electrolyte compositions using alternate solvents (as detailed in the Examples), demonstrated significant differences between electrolytes containing the naphthyl amines vs electrolytes containing amines not of the invention.

Electrolytes comprising phenyl naphthyl amine and alkylated phenyl naphthyl amine exhibit excellent stability Electrolytes containing e.g., phenyl naphthyl amine exhibit very low current intake indicating electrochemical stability at low potentials and good diffusion according to the Cattrell Equation. The Cattrell equation describes the change in electric current relative to time.

$$i = nFAc_o^O(D_O)^{1/2}/\pi^{1/2}t^{1/2}$$

Where
n=number of electrons
F=Faraday constant, 96,500 coulombs/mole
A=area of the (planar) electrode in units cm2
$c_o^O$=initial concentration of the reducible analyte O with units molarity
$D_O$=diffusion coefficient for species O in units cm$^2$/s
t=time in s
Generally, the Cottrell equation simplifies to $$i = kt^{-1/2},$$

where k is the collection of constants for a given system (n, F, A, $c_o^O$, $D_O$) and (scan rate)$^{1/2}$ is used in place of t$^{-1/2}$.

The current measured depends on the rate at which the analyte diffuses to the electrode, and as the electrolyte diffusion becomes slower, the efficiency of the electrochemical system degrades. A high current intake indicates a higher diffusion coefficient for the electrolyte and thus can be correlated with instability.

Figure 2:
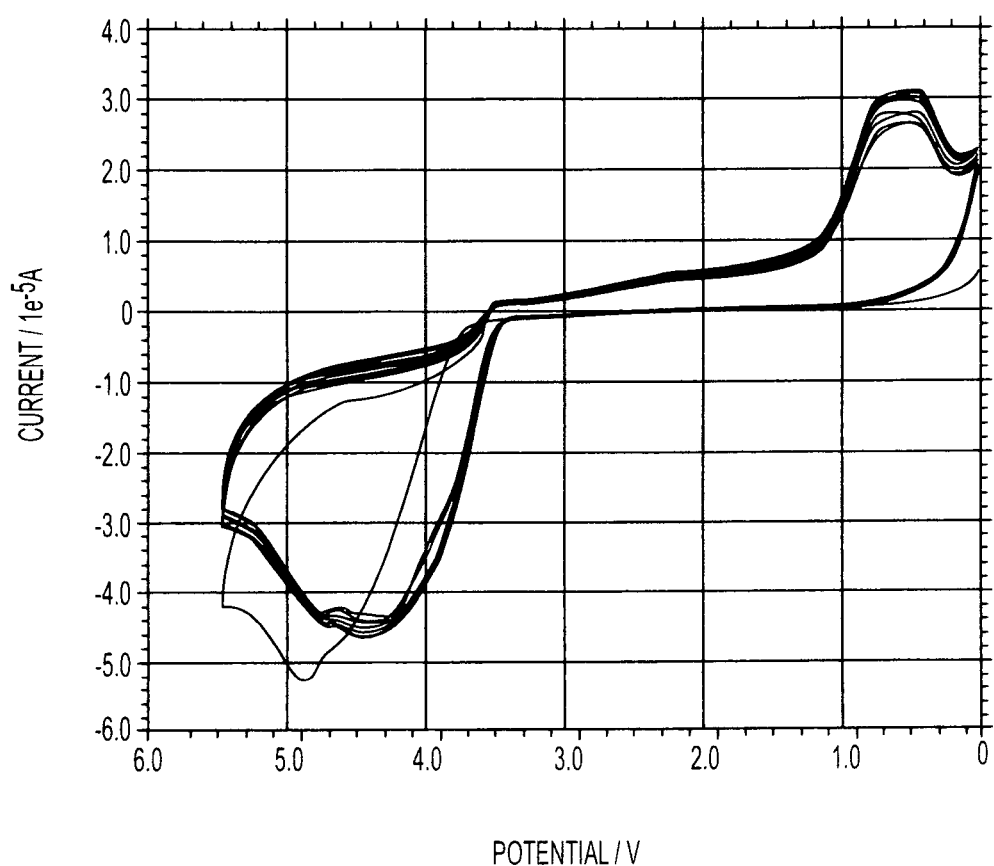
FIG. 2 shows the cyclic voltamograms obtained following the procedure of the present examples on the electrolyte solution prepared according to the present examples using the amine of Example 5.

Reproducible oxidation/reduction cycles for electrolytes comprising select phenyl naphthyl amines showed low current intake and little to no signs of decomposition. For example, FIG. 2 shows very little difference in the scans as they are repeated over time. In contrast, the phenylene diamines and diphenylamines tested, e.g., FIG. 1, exhibit much higher current intake, i.e., −1 order of magnitude higher than seen in FIG. 2, indicating a higher diffusion coefficient and show other signs of decomposition and electrode fouling after repeated scans, e.g., the lack of convergence of the scan at 0V in FIG. 1. is indicative of fouling at the electrode.

Thus, amines substituted by at least one naphthyl group are much more compatible with, and stable under, applied voltage conditions, such as encountered in the operation of a battery, than amines substituted by phenyl but not naphthyl. The better suitability of naphthyl amines for battery application appears to be general for battery applications in the range of 1-12 V or greater, for example 1-9 V, 1-6V, 1-5V or 1-4V.

Additionally, the electrolyte compositions of the present invention optionally comprise additives for improving viscosity, increasing ion conductivity and/or improving the stability or other physical characteristics of the power source containing the electrolyte composition. For example, the use of surfactants, such as polyethers or sulfonates are known. The additives may be present in amounts ranging from 0.001 wt % to 10.0 wt %, e.g., from 0.005 wt % to 5.0 wt %, from 0.005 wt % to 1.5 wt %, from 0.01 wt % to 1.0 wt %, or from 0.01 wt % to 0.4 wt %, based on the total weight of the battery electrolyte composition.

In addition to improving performance of the electrolyte composition, additives may also further improve the flame retardancy of the electrolyte composition. In one embodiment phosphorus-containing flame retardants such as phosphates, phosphazenes, phosphines, phosphinoxides, and fluorophosphates are added to the electrolyte composition. As mentioned above, flame retardant solvents and co-solvents are known which may be present in at higher amounts than other additives. In addition to those already found in the earlier cited references, effective phosphorous containing flame retardants/thermal inhibitors/or thermal stabilizers can be found in, e.g., US 2003/0003358, US 2009/0291370, US 2010/0047695, the disclosures of which are incorporated herein by reference. The aromatic amines, e.g., naphthyl amines, of the present compositions are in many cases synergistic with these phosphorous containing additives, and are also expected to aid the activity of other non-phosphorous flame retardants.

The present invention also provides an electroactive device such as a battery comprising a positive electrode, a negative electrode, and the non-aqueous electrolyte composition described herein. The presence of the naphthyl amine improves the performance of the electrolyte and of the battery in terms of oxidation/reduction potential, cycle efficiency, and overall battery life. The naphthyl amine provides deposit control and prevents electrode fouling, The inventive electrolyte composition may be used with various battery technologies (primary or secondary batteries), including lithium-ion batteries, other alkali metal ion batteries, and batteries using transport of other metal ions, or organic ions.

The battery comprises one or more electrochemical cells that each comprise a positive electrode (cathode), a negative electrode (anode), and the non-aqueous electrolyte composition. As one of ordinary skill understands, the anode and cathode designations for lithium ion batteries and similar rechargeable batteries are related to the discharge cycle.

The composition and manufacture of batteries are well known, e.g., U.S. Pat. No. 5,759,714 and U.S. Pat Appl Pub No. 2008/0020285 already incorporated by reference, and no particular limitation is placed on the types of electrodes etc that may be employed. In the formation of the non-aqueous electrolyte battery, the non-aqueous electrolyte according to the invention can be used as it is, but may be used through a method of impregnating into, for example, a suitable polymer, a porous support or a gelatinous material for keeping.

The non-aqueous electrolyte battery of the invention comprises the above-mentioned non-aqueous electrolyte for the battery, positive electrode and negative electrode, and may be provided with other components usually used in the technical field of the non-aqueous electrolyte battery such as a separator and the like. In this case, the non-aqueous electrolyte battery of the invention may be constructed as a primary battery or a secondary battery.

One embodiment of the invention provides a method for reducing deposit formation at an electrode which is in contact with an electrolyte, by incorporating into the electrolyte one or more naphthyl amines according to formula (I) or salt thereof.

Some embodiments of the invention provide a battery with improved battery lifetime, especially at high temperature and when exposed to repeated charge discharge cycles, both conditions being common in e.g., electric car batteries. One measure of battery lifetime is capacity ratio as described in US 2009/0291370, already incorporated by reference. Another embodiment of the invention provides a method for deposit control at an electrode in a device which uses a non-aqueous electrolyte.

Other embodiments of the invention allow one to use less additives or other components of the electrolyte due to the stabilizing effect of the amine or to synergy achieved when the amine is combined with an additive. For example, phosphorus based flame retardants such as the cyclic phosphazenes and diflourophosphates of, e.g., US 2008/0020285, are more effective in the presence of the present amines. This allows one to reduce the amount of flame retardant required which can lower cost and improve battery efficiency by reducing the amount of potentially interfering materials and degradation products.

EXAMPLES

Electrolyte solutions containing a series of commercially obtained aromatic amine additives were prepared by adding 5 wt % of the additive to a 1 M solution of $LiPF_6$ in a 1:1 weight/weight mixture of ethylene glycol/diethylene glycol.

Electrochemical Cells using glassy carbon electrode, lithium wire as counter and reference electrode and containing the electrolyte solutions were subjected to repeated Cyclic Voltammograms experiments which were carried out in an nitrogen-filled glove compartment. Experiments were cycled between 0 to 5.5 V at 0.1 V/s interval for 11 reduction and 11 oxidation cycles. The resulting Voltammograms are shown in the accompanying figures. The commercial amine additives selected are listed below along with a summary of the results.

Example 1

N,N'-di-sec-butyl Phenylene Diamine

Takes in very high current, indicating higher Diffusion Coefficient and higher instability. Oxidation/reduction events are reproducible.

Example 2

Diphenyl Amine Alkylated on the Aromatic Ring(s) by Nonyl

Takes in very high current indicating higher diffusion coefficient and higher instability; indications of electrode fouling seen.

Example 3

Diphenyl Amine Alkylated by on the Aromatic Ring(s) by Cumyl

Very complex red-ox chemistry, not a stable under these conditions; indications of electrode fouling seen.

Example 4

Diphenyl Amine Alkylated by on the Aromatic Ring(s) by T-octyl and/or Butyl

Takes in very high current; three oxidation and one reduction events; indications of electrode fouling seen.

Example 5

1-naphthyl Phenylamine

Compound of formula II wherein R1 is phenyl, R2 is H and n is 0. Takes in very low current; highly reproducible oxidation/reduction events, very stable. No electrode fouling observed

Example 6

1-naphthyl Phenylamine Alkylated by on the Aromatic Ring(s) by N-octyl

Two main oxidation events occur between 4-5 V; Reverse reduction event occurs between 0-1 V; excellent stability between 0-3.5 V. No electrode fouling observed.

A high current indicates a higher diffusion coefficient whereas lower diffusion coefficients are desired. Given the data, select naphthyl phenylamines show excellent properties for use in e.g., electrolytes for batteries, as they appear very stable under the conditions, show little to no signs of electrode fouling, and in some cases will take in very low current. The phenylene diamine tested took in very high current indicating a high diffusion coefficient. The three diphenyl amines took in higher current than naphthyl phenylamine and show clear signs of electrode fouling. Table 1 summarizes the data for the above examples, numerical data is reported as absolute values, i.e., without +/− designation, FIG. 1 and FIG. 2 show the graph s obtained for Ex. 4 and 5.

| Example | Oxidation | Reduction | Current at Oxidation | Electrode Fouling |
|---------|-----------|-----------|----------------------|-------------------|
| 1 | 4.0 V, 4.6 V | 3.2 V, 2.8 V | 8e−4 Amp | Yes |
| 2 | 3.9 V, 4.2 V | ~2 V | 1.5e−4 Amp | Yes |
| 3 | 3.8 V, 4.6-5.2 V | 2.2 V 0.8 V | 5.2e−4 Amp | Yes |
| 4 | 3.9 V, 5.0 V | 2.2-2.0 V | 3.7e−4 Amp | Yes |
| 5 | 4.2-4.6 V | 0.7-0.3 V | 4.6e−5 Amp | NO |
| 6 | 3.6 V, 4.2 V 5.0 V | 0.6 V, 0.4 V | 3.8e−4 Amp | NO |

The invention claimed is:

1. A non-aqueous electrolyte composition, comprising:
(a) an electrolyte salt;
(b) a non-aqueous electrolyte carrier; and
(c) one or more naphthyl amines according to formula (II) or (III) or salt thereof

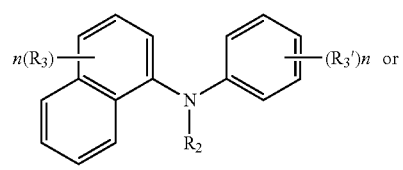

(II)

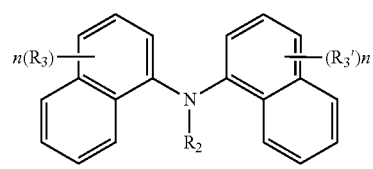

(III)

wherein each n is independently selected from 1, 2, 3 or 4
$R_2$ is H, $C_{1-24}$ alkyl, $C_{5-8}$ cyclic alkyl, benzyl, $C_{2-24}$ alkyl interrupted by —O—, $SO_2$—, —CO— or —COO—, and/ or substituted by hydroxy, alkoxy, alkylcarbonyloxy, carboxylate, or sulfate; or benzyl substituted by alkyl, hydroxy, $C_{1-12}$ alkoxy, or sulfate; and
each $R_3$ and $R_3'$ are independently selected from the group consisting of $C_{1-24}$ alkyl, $C_{5-8}$ cyclic alkyl, phenyl, benzyl, styryl, cumyl, hydroxy, $C_{1-12}$ alkoxy, and sulfate.

2. The non-aqueous electrolyte composition according to claim 1 wherein
n is 1 or 2;
each $R_3$ and $R_3'$ are independently selected from $C_{4-8}$ alkyl, phenyl, benzyl or $C_{1-12}$ alkoxy; and $R_2$ is H, $C_{1-24}$ alkyl, $C_{5-8}$ cyclic alkyl, benzyl, or benzyl substituted by alkyl or $C_{1-12}$ alkoxy.

3. The non-aqueous electrolyte composition according to claim 1 wherein the one or more naphthyl amines are selected from compounds of formula (II).

4. The non-aqueous electrolyte composition of claim 1, wherein the electrolyte composition is a gel or liquid electrolyte.

5. The non-aqueous electrolyte composition of claim 1, wherein the electrolyte is a solid electrolyte.

6. The non-aqueous electrolyte composition of claim 1 comprising the one or more naphthyl amines according to formula (II) or (III) in an amount of from about 0.01% to about 10% by weight based on the total weight of the electrolyte composition.

7. The non-aqueous electrolyte composition of claim 1, wherein the non-aqueous electrolyte carrier is selected from the group consisting of dimethyl carbonates, diethyl carbonates, diphenyl carbonates, ethyl methyl carbonates, vinylene carbonates, propylene carbonates, ethylene carbonates, diethylene carbonates, butylene carbonates, methyl ethylene carbonate, propionates, acetates, 1,2-di-methoxy ethanes, 1,2-di-ethoxy ethanes, tetrahydrofurans, diethyl ether, gamma-valerolactones, gamma-butyrolactones, carboxylate esters, nitriles, amides, sulfones, and sulfides.

8. The non-aqueous electrolyte composition of claim 1, further comprising a phosphorus-containing compound selected from the group consisting of phosphate, fluorophosphate and phosphazene.

9. The non-aqueous electrolyte composition according to claim 1 wherein the electrolyte salt (a) comprises a lithium salt.

10. A battery comprising:
a positive electrode;
a negative electrode; and
a non-aqueous electrolyte composition according to claim 1.

11. A method for reducing deposit formation at an electrode which is in contact with an electrolyte, by incorporating into the electrolyte one or more naphthyl amines according to formula (II) or (III) or salt thereof

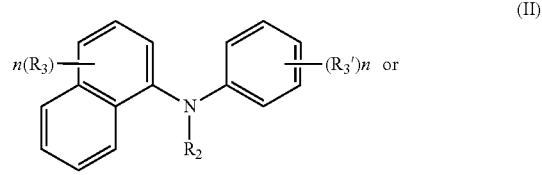

(II)

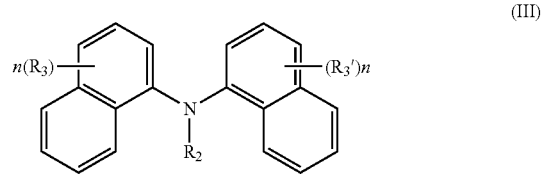

(III)

wherein each n is independently selected from 1, 2, 3 or 4

$R_2$ is H, $C_{1-24}$ alkyl, $C_{5-8}$ cyclic alkyl, benzyl, $C_{2-24}$ alkyl interrupted by —O—, $SO_2$—, —CO— or —COO—, and/ or substituted by hydroxy, alkoxy, alkylcarbonyloxy, carboxylate, or sulfate; or benzyl substituted by alkyl, hydroxy, $C_{1-12}$ alkoxy, or sulfate; and each $R_3$ and $R_3'$ are independently selected from the group consisting of $C_{1-24}$ alkyl, $C_{5-8}$ cyclic alkyl, phenyl, benzyl, styryl, cumyl, hydroxy, $C_{1-12}$ alkoxy, and sulfate.

* * * * *